(12) United States Patent
Reitano

(10) Patent No.: US 6,535,853 B1
(45) Date of Patent: Mar. 18, 2003

(54) SYSTEM AND METHOD FOR DYSLEXIA DETECTION BY ANALYZING SPOKEN AND WRITTEN WORDS

(76) Inventor: Carmen T. Reitano, 192 N. End Blvd., Salisbury, MA (US) 01952

( * ) Notice: Subject to any disclaimer, the term of this patent is extended or adjusted under 35 U.S.C. 154(b) by 0 days.

(21) Appl. No.: 10/064,761
(22) Filed: Aug. 14, 2002
(51) Int. Cl.$^7$ ............................................. G10L 21/00
(52) U.S. Cl. ..................... 704/271; 704/270; 434/156; 434/167
(58) Field of Search .................. 704/270, 275, 704/271; 434/156, 167, 169, 185; 340/566; 345/863

(56) References Cited

U.S. PATENT DOCUMENTS 5,596,698 A * 1/1997 Morgan ...................... 345/863
5,920,838 A * 7/1999 Mostow et al. ............. 704/255
6,468,084 B1 * 10/2002 MacMillan .................. 434/185

\* cited by examiner

Primary Examiner—Susan McFadden
(74) Attorney, Agent, or Firm—Mark P. White

(57) ABSTRACT

A dyslexia detection system displays a test word, either alone, or within a sentence. The test subject is asked to pronounce the test word, and to write it on a handwriting input device, such as a tablet. The system analyzes the spoken words, comparing them to sound records in a library of properly pronounced phonemes which make up the test word. The system also analyzes the characters written by the subject, and detects whether any of the characters correspond to a member of a distorted character set containing distortions commonly produced by dyslexics. A summary of errors in pronunciation shows errors in pronunciation as mispronounced phonemes, and errors in writing are displayed as erroneously written characters.

13 Claims, 2 Drawing Sheets

|   | Phoneme | Word | Pronounced |    | Phoneme | Word | Pronounced |
|---|---------|------|------------|----|---------|------|------------|
| 1 | AA | odd | AA D | 21 | L | lee | L IY |
| 2 | AE | at | AE T | 22 | M | me | M IY |
| 3 | AH | hut | HH AH T | 23 | N | knee | N IY |
| 4 | AO | ought | AO T | 24 | NG | ping | P IH NG |
| 5 | AW | cow | K AW | 25 | OW | oat | OW T |
| 6 | AY | hide | HH AY D | 26 | OY | toy | T OY |
| 7 | B | be | B IY | 27 | P | pee | P IY |
| 8 | CH | cheese | CH IY Z | 28 | R | read | R IY D |
| 9 | D | dee | D IY | 29 | S | sea | S IY |
| 10 | DH | thee | DH IY | 30 | SH | she | SH IY |
| 11 | EH | Ed | EH D | 31 | T | tea | T IY |
| 12 | ER | hurt | HH ER T | 32 | TH | theta | TH EY T AH |
| 13 | EY | ate | EY T | 33 | UH | hood | HH UH D |
| 14 | F | fee | F IY | 34 | UW | two | T UW |
| 15 | G | green | G R IY N | 35 | V | vee | V IY |
| 16 | HH | he | HH IY | 36 | W | we | W IY |
| 17 | IH | it | IH T | 37 | Y | yield | Y IY L D |
| 18 | IY | eat | IY T | 38 | Z | zee | Z IY |
| 19 | JH | gee | JH IY | 39 | ZH | seizure | S IY ZH ER |
| 20 | K | key | K IY |    |    |    |    |

Figure 1

| OUGHT [2] | (PTR XY1) [4] | 4,32,0,0,0 [6] |
|-----------|---------------|----------------|
| TOUGH [12] | (PTR XY2) [14] | 32,3,0,0 [16] |

Figure 2

| OUGHT [42] | (PTR Z1) [44] | 4,32,0,0,0 [46] | S/F(1) [48] |
|------------|---------------|-----------------|-------------|
| OUGHT [42] | 0 [44] | 4,32,0,0,0 [46] | S/F (0) [49] |

Figure 3

| OUGHT [42] | (PTR Z1) [44] | 4,32,0,0,0 [46] | S/F(1) [48] | (PTR S1) [50] | (SW/FW(1) [52] |
|------------|---------------|-----------------|-------------|---------------|----------------|

Figure 4

SYSTEM AND METHOD FOR DYSLEXIA DETECTION BY ANALYZING SPOKEN AND WRITTEN WORDS

BACKGROUND OF INVENTION

The present invention relates to systems and advanced methods for the detection of various forms of dyslexia, and more particularly to such systems and methods incorporated in existing handwriting and speech recognition systems.

DESCRIPTION RELATIVE TO THE PRIOR ART

Dyslexia is a general term for a family of learning disabilities. Its symptoms include problems in expressive or receptive oral or written language. Derived from the Greek words "dys" (poor or inadequate) and "lexis" (words or language). Dyslexia affects reading, spelling, writing, memory and concentration, and sometimes math, music, foreign languages and self-organization. Dyslexia and other related learning disabilities affect about 15% of the population.

There is a consensus as to the need for early detection and treatment. The symptoms can be difficult to detect, however, especially at an early age. In pre-schoolers these symptoms may include the following:

Later than expected learning to speak clearly.
Jumbling phrases, e.g. 'cobbler's club' for 'toddler's club', 'teddy-dare' for 'teddy-bear'.
Use of substitute words or 'near misses'.
Mislabeling e.g. lampshade for lamp post.
Speaking with lisp—'duckth' for 'ducks'.
Inability to remember the label for known objects, e.g. colours.
Confusing directional words, e.g. 'up/down' or 'in/out'.
Excessive tripping, bumping and falling over nothing.
Enhanced creativity—often good at drawing—good sense of colour.
Obvious 'good' and 'bad' days for no apparent reason.
Having aptitude for constructional or technical toys, e.g. bricks, puzzles, lego blocks, control box for TV and video, computer keyboards.
Enjoying being read to but showing no interest in letters or words.
Difficulty learning nursery rhymes.
Finding difficulty with rhyming words, e.g. 'cat mat fat'.
Finding difficulty with odd-one-out, e.g. 'cat mat pig fat'.

New research has identified three subtypes of dyslexia identified as dyseidesia, dysphonesia, and dysphoneidesia. Dyseidesia is a deficit in the ability to perceive whole words with their sounds. This subtype mainly affects the reading of non-phonetically regular words, such as laugh. Dysphonesia is a deficit in word analysis skills. People with this subtype have trouble with unfamiliar words as well as word association, as in the difference between home and house. Dysphonedeisia is a combination of the previous two subtypes.

The current invention is based on the well-known tendencies of dyslexics to perceive characters in unique ways, both in the perception of the characters, and in attempts to reproduce those characters by drawing the characters as they see them. It is further based on the inability of dyslexics to utilize normal discretionary skills to recognize these individual character groupings when they are assembled into words and to pronounce them properly.

The English language offers special problems in pronunciation due to its varied roots in distinct language groups. English is not a phonetic language, and the same combinations of letters are pronounced differently in different words. For example, the combination "ough" has a different pronunciation in the words "through", "though", "thought", "tough", and "plough". Similarly, the word "bow" is pronounced differently when used in the sense of bending at the waist, as compared to meaning a knot in a ribbon.

This invention is implemented by means of various software and hardware products that are well developed and in wide use at the present time. These include handwritten character recognition systems, both printed and cursive, as well as text to speech systems and automatic speech recognition systems. These systems all have one characteristic in common. The systems compare inputs, both handwritten and spoken, to a library of acceptable, ideal or target models, and reject those characters that do not conform to any recognized models in their various libraries. These rejected or failed input attempts, both written and spoken, are stored on magnetic system disks for later analysis.

The present invention expands this technique to include not only recognizable legitimate inputs, but also illegitimate or rejected inputs. When the test subject of one of these systems generates a significant number of these failed inputs, the invention records these in memory associated with the system"s handwriting recognition and speech recognition systems and creates a statistical profile of the errors, thus enabling the data to produce a report warning that the test subject may be displaying characteristics associated with a specific form of dyslexia.

The stored inputs have the added advantage of being able to be printed in hard copy form, displayed on a computer screen and or simultaneously listened to on the systems associated audio system.

This invention has the great advantage that it does not require any advances in the basic technologies of handwritten character recognition, text to speech, or automatic speech recognition systems.

The current invention can be incorporated into games currently available on computer and INTERNET systems for young children of pre-school and early school age, thus providing the early warning so urgently needed.

SUMMARY OF INVENTION

It is an object of the present invention to provide a method to detect the inability of a test subject to reproduce letters of the alphabet, and to further detect the inability of the test subject to properly pronounce the test words.

In accordance with one aspect of the method, a library of test words is constructed, wherein for each word, the library includes a sound recording of the correct pronunciation of the word, a written representation of the word, and the identity of each phoneme contained therein; In accordance with another aspect of the method, the system displays the written representation of one of the words contained within the library, and the subject is requested to pronounce the word displayed.

In accordance with a third aspect of the method, the pronounced word is pronounced by the subject, and recorded as a response sound record.

In accordance with a fourth aspect of the method, the response sound record is compared with the sound record of the test word, and the response is recorded as properly or improperly pronounced, together with the identity of the phonemes contained in the test word.

In accordance with a fifth aspect of the invention, the process is repeated until a statistically significant number of test words has been processed.

In accordance with a sixth aspect of the invention, a report is generated summarizing the number of proper and improper pronunciations, the words improperly pronounced, and the phonemes contained in each such word.

In accordance with a seventh aspect of the invention, the comparing of the response sound record of the sound record of the test word is done by currently used voice recognition techniques.

In accordance with an eighth aspect of the present method the test words displayed further are made up of words containing phonemes which are different, but have identical spellings.

In accordance with a ninth aspect of the method, the voice recognition analysis further includes breaking down the response record into phonemes, wherein each sound record in the library of test words further includes a collection of separate sound bytes, each of which represents a separate phoneme of the corresponding test word.

In accordance with a tenth aspect of the present invention, the report includes an audio record of each improperly pronounced word, which may be output to an output device, such as a loudspeaker, during a review of the report.

BRIEF DESCRIPTION OF DRAWINGS

These, and further features of the invention, may be better understood with reference to the accompanying specification and drawings depicting the preferred embodiment, in which:

FIG. 1 depicts a table of phonemes used in the present invention.

FIG. 2 depicts two typical records in the library of test words in the first preferred embodiment.

FIG. 3 depicts two typical records in the library of responses in the first preferred embodiment.

FIG. 4 depicts two typical records in the library of responses in the second preferred embodiment.

DETAILED DESCRIPTION

Description of Preferred Embodiment

Figure 5:
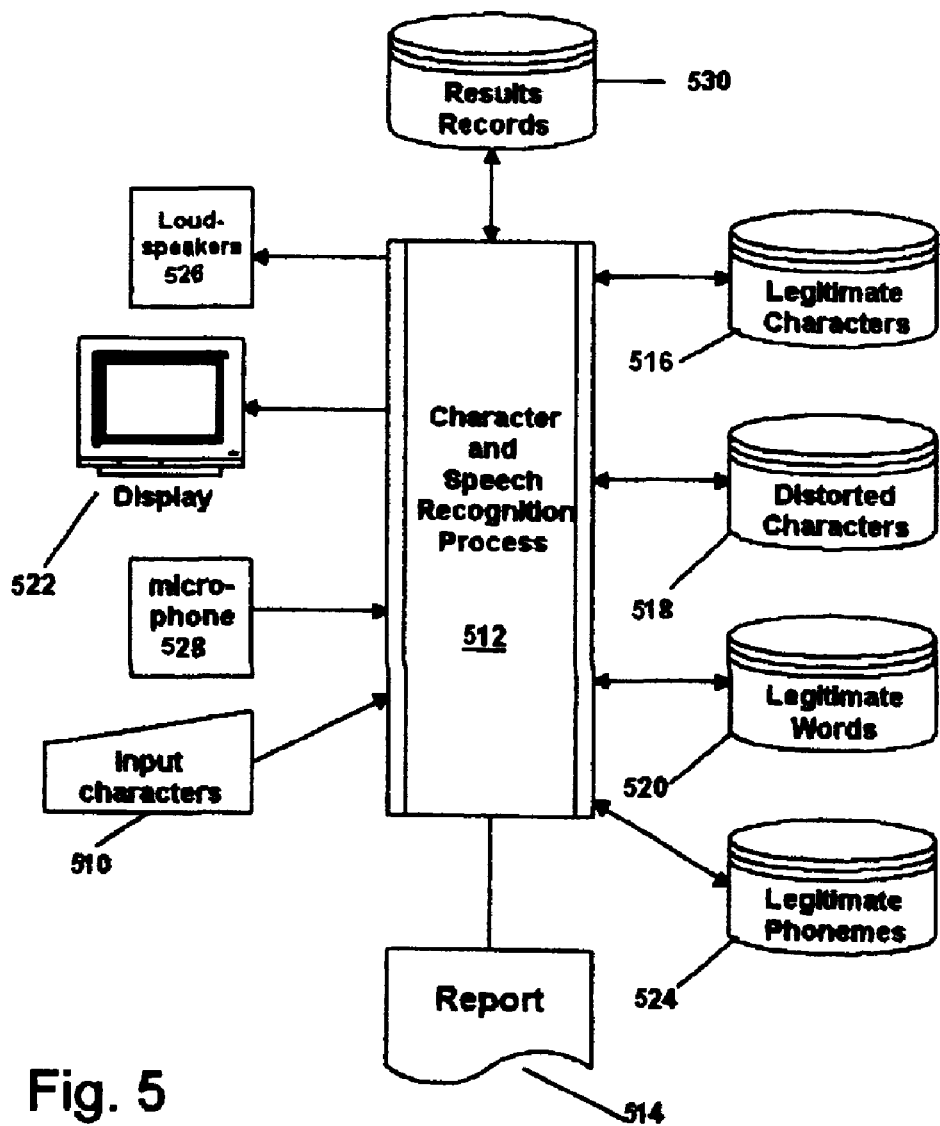
FIG. 5 depicts a system diagram showing the components used in the present invention.

The current invention provides a test which identifies a test subject's inability to properly pronounce a variety of phonemes in the English language. These "problem" phonemes are generally the complex vowels, or diphthongs. Many of these diphthongs have identical spellings, but are pronounced differently in different words.

There are many different phoneme sets used by various organizations for various purposes. For instance, a pronunciation set can be found at the beginning of most dictionaries.

The phoneme set used to describe this invention has 39 phonemes, and does not include variations for lexical stress. However, other phoneme sets may clearly be used as variations or other embodiments of the invention.

The present invention utilizes existing voice recognition and character recognition systems. Both of these technologies are mature, well developed, and widely used. Regarding voice recognition systems, over fifty United States patents have been issued within the last three years, including U.S. Pat. Nos. 6,275,800, and 6,411,926, which are typical of the genre.

The table which appears as FIG. 1 identifies the current phonemes provides a sample target word and keys to the phonetic pronunciation of the word.

Referring now to FIG. 5, the preferred embodiment is incorporated in the form of a computer system which performs the character and speech recognition process 512, and which includes a sound card which allows the input of sound by means of a microphone 528, and also plays sounds through loudspeakers 526, or headsets attached to the sound card. The computer VDT or monitor screen 522 is used to display the test words which the test subject is asked to pronounce, and to write Input of characters is via a tablet or similar input device OLE_LINK1OLE_LINK1510, and printed reports 514 are produced on a printer or similar output device.

The invention first requires the compilation of a library 516 of words made up of legitimate characters which include the diphthongs which are the subject of the test method of this invention. This library contains information about selected test words, the information including a sound record corresponding to each word, a properly spelled version of the word in ASCII format, and an identification of the phonemes which make up the word. The information for each word of the library is kept in a record corresponding to that word. The library is stored in the computer memory.

A library 518 of graphic records of the distorted characters typical of those made by dyslexics in attempting to reproduce legitimate characters is also included.

Another library 520 is included which contains legitimate words, or test words, which are displayed on the monitor or other display 522 which the subject is asked to pronounce and write on the input device.

A library 524 of legitimate phonemes contains sound records of the phonemes of the table shown in FIG. 1. These phonemes are combined to produce the properly pronounced test words.

Finally, a library 530 of results records is generated as the subject responds to the method by speaking into the microphone, producing sound records, and by drawing or writing the test words on the input tablet or other input device.

FIG. 2 shows two typical records of test words represented in such libraries. This record corresponds to the word "ought". The first field 2 contains the ASCII representation of the word. The second field 4 is a pointer to the sound record which exists in a separate area of computer memory. The third field 6 contains the index numbers of the phonemes which make up the word, in this case phonemes number 4 and 231.

In the next record, the word "TOUGH" 12 has pointer to the corresponding sound record 14, followed by the phonemes 32,3 (16). Each word in the library has a similar record corresponding to that particular word.

The test subject now is shown a word on the monitor, which he is asked to pronounce. The test subject pronounces the word, which is input to the system by the microphone attached to the sound card, and stored as a test response sound record in a test response file 114, as shown in FIG. 3. The test subject's pronounced response sound record is compared to the library sound record.

The comparison is done using voice or speech recognition techniques which are currently well known and widely used. If the test subject has properly pronounced the word, an entry is made in a results file identifying the test word 42, together with a "success" indicator. However, if the test subject mispronounced the word, the results file record contains a "failure" indicator, together with a pointer 44 to the response sound record.

A typical record of this results file, as a result of a mispronounced word, is shown in FIG. 3. The test word [42] is followed by a pointer to the test response sound record [44] in the case when, as shown, the word was mispronounced. Following are the index numbers 46 of the phonemes making up the test word, and finally, a success/failure indicator 48.

The second record shown in FIG. 3 shows the same record as the one above, except that the second record is the result of a successfully pronounced word. Only the Success/Failure indicator 49 is changed. In the case of a successfully pronounced word, the pointer to the test response sound record is a zero.

The records of the results file can then be used to produce various summaries of the test results. Because many of the test words contain more than one phoneme, the failure to properly pronounce a test word may not definitively identify the offending phoneme. Therefore, statistical methods are used to determine which phonemes are most generally mispronounced.

For instance, the word "Tough" contains the phonemes "T" (32), and "AW" (3). A subject mispronouncing this word may mispronounce either or both of the phonemes. However, a subject who lisps will generally mispronounce all words containing the "T" (32), while not mispronouncing other words containing the "AW" (3) phoneme. Thus, the testing of the subject with other words containing the phoneme "AW" (3) will show that the subject's problem is in the pronunciation of "T" (32). (Note, however, that such a problem is not a symptom of dyslexia).

It should here be noted that this method is a method of detection, and not remediation. Thus, the essence of this method is to identify a pattern of mispronunciation of certain phonemes. The analysis of the results by statistical methods which are well known, such as regression analysis, will clearly indicate when such a consistent pattern of mispronunciation exists, and will identify which phonemes cause such problems.

In an alternative embodiment of this invention, the libraries of test words and phonemes will contain not only the proper pronunciations of phonemes within the test words, but may also contain versions of the test words with common mispronunciations of the phonemes contained therein. In this case, the analysis of the response sound record may establish not only that the subject pronounced the phoneme incorrectly, but also identify the incorrect phoneme substituted for the correct phoneme.

At the end of the test session, the results are reviewed by a reviewer in one of a number of forms. The exact configuration may be chosen by the reviewer. The reviewer may review reports which give summaries, indicating the number of errors made in pronunciation, the percentage of errors relative to the total number of test words presented, and the identities of the improperly pronounced phonemes.

Besides summaries, the reviewer may review all of the mispronounced words, one at a time, and may both view the words in printed form, and may listen to the correct pronunciations and the incorrect pronunciations of the subject.

More detailed reports can be printed out which list each of the improperly pronounced words, and, in the case where the test library contains improperly pronounced versions of the test words, the report may identify the phonemes actually mispronounced by the subject.

In an alternative embodiment the test words are displayed within a sentence, so that the test subject may distinguish between phonemes which are spelled the same, but pronounced differently.

For instance, the sentence "The boy takes a <bow> after finishing his performance" is first displayed. Then a second sentence, "The boy ties a <bow> in the ribbon" is displayed. The word "bow" in highlights, or bracketed, is the test word, which the test subject is asked to pronounce.

Second Preferred Embodiment

This embodiment includes a provision for the test subject to write the test word on an input device, such as a tablet or pen-pad. The test subject is then asked to pronounce the word, as in the first preferred embodiment, and also to write the word on the tablet or other input device. The computer then analyzes both the test subject's pronunciation and written representation of the test word.

The second embodiment utilizes the method described in U.S. Pat. No. 6,304,667, which is incorporated herein by reference in its entirety. The method of detecting errors in the test subject's attempts to reproduce letters included in this embodiment, except that the letters written as a word by the test subject are analyzed, one at a time in the present invention, rather than singly as in said patent.

In this second embodiment additional libraries of both legitimate character sets and distorted character sets are included in the invention, and the analysis of the test subject's written representations of the test word are analyzed to detect not only errors, but to note whether or not the errors are those included in the distorted character sets.

The reports generated in this embodiment include summaries of both the improperly pronounced phonemes, but also of the improperly drawn characters, and the words in which they appear.

A typical record in the library of test results appears in FIG. 4. The fields in the records are the same as those which appear in FIG. 3, except that pointer 50 points to the stored graphic records which make up the characters of the word produced by the test subject in attempting to reproduce the test word, and an additional success/failure indicator 52 is used to indicate whether the test subject has written the test word properly or improperly. In the case of a successfully written word, the pointer to the test response graphics records is a zero.

The report may be output in the form selected by the test subject. In analyzing the resulting errors, the reviewer may request a printout of both the errors in pronunciation and the errors in writing. In the case of errors in pronunciation, the reviewer may listen to the sounds produced by the test subject.

FIG. 5 shows the system used to implement this method in its best mode. The character and Speech Recognition process 512 resides on a computer, the display 522 being the monitor. Characters are input via the input 510, typically a pen/pad or tablet device 510, while sounds are input through the microphone 528. Loudspeakers 526 output the sounds as required, and the reports 514 are created either on the monitor, or as hard copy by printer.

The libraries are stored in the computer memory, most commonly on hard disks, in files which include legitimate characters 516, distorted characters 518, legitimate words which make up the test words 520, and legitimate phonemes 524, from which the test words are composed. The results in the form of graphics records and sound records produced by the test subject are stored in the results records 530.

Other implementations of this invention include the Internet.

It will be apparent that improvements and modifications may be made within the purview of the invention without departing from the scope of the invention defined in the appended claims.

What is claimed is:

1. An automated method for detecting learning disabilities in a subject, comprising:

(a) constructing a library comprising a multiplicity of test words each further comprising one or more phonemes, wherein for each test word, the library further comprises a sound record of the correct pronunciation, a written representation, and the identity of each phoneme contained therein;

(b) displaying the written representation of one of the test words as a sample word;

(c) requesting the subject to pronounce the sample word and recording the pronounced word as a response record;

(d) comparing the sample sound record to the response sound record, and identifying the response as properly or improperly pronounced;

(e) recording the identity of each improperly pronounced response, and the identity of the phonemes contained therein;

(f) repeating the steps from (c) to (e) with a plurality of different test words until a statistically significant number of test words has been displayed; and (g) generating a report summarizing the number of proper and improper pronunciations, the test words improperly pronounced, and the phonemes contained in each such test word.

2. The method of claim 1, wherein the identity of each phoneme further comprises a symbolic representation.

3. The method of claim 2, wherein the comparing of the sample sound record to the response sound record further comprises speech recognition analysis.

4. The method of claim 3, wherein the test words displayed further comprise words containing phonemes which are different from each other, but have identical spellings.

5. The method of claim 4, wherein the voice recognition analysis further comprises breaking down the response sound record into phonemes, and wherein each sound record in the library further comprises a multiplicity of separate sound bytes, each of which represents a separate phoneme.

6. The method of claim 5, wherein the method is implemented by devices which comprise computers, sound input and storage devices, and visual displays, and by computer software.

7. The method of claim 6, wherein the report further comprises a response record of each improperly pronounced sample word, and further comprising outputting of one or more such response records during a review of the report.

8. The method of any of claims 1 through 7, further comprising:

(a) including in the library a set of legitimate characters;

(b) including in the library a set of distorted characters;

(c) inputting characters by the student;

(d) detecting a correspondence between each input character and one of the distorted characters;

(e) determining a pattern of inputting of distorted characters; and (f) recording said pattern.

9. The method of claim 8, wherein the set of distorted characters further comprises mirror images of the legitimate characters.

10. The method of claim 9, wherein each distorted character is associated with a legitimate character, wherein each mispronounced word is associated with a properly pronounced word, and wherein said reporting further comprises statistical reporting of distorted characters input and the mispronounced words input.

11. The method of claim 10, wherein the set of distorted characters further comprises a subset of global distorted characters and one or more subsets of local distorted characters.

12. The method of claim 11, wherein the subsets of local distorted characters are collected by statistical sampling methods from individual users, and wherein a subset of local distorted characters is associated with each individual user.

13. The method of claim 12, further comprising associating each distorted character with a true character, and reporting the true character together with the distorted character detected.

* * * * *